United States Patent [19]
Dugdale et al.

[11] Patent Number: 5,424,839
[45] Date of Patent: Jun. 13, 1995

[54] METHOD AND APPARATUS FOR ALIGNING VISUAL IMAGES WITH VISUAL DISPLAY DEVICES

[75] Inventors: Jonathan L. Dugdale, Burleson; Ross N. Lindly, Fort Worth, both of Tex.

[73] Assignee: Hughes Training, Inc., Arlington, Tex.

[21] Appl. No.: 22,707

[22] Filed: Mar. 1, 1993

[51] Int. Cl.⁶ .................. G01B 11/27; G01B 11/00
[52] U.S. Cl. .................. 356/401; 356/399; 250/461.1; 250/459.1
[58] Field of Search .......... 356/399, 401, 400; 250/458.1, 459.1, 461.1

[56]  References Cited
  U.S. PATENT DOCUMENTS

| | | | |
|---|---|---|---|
| 3,676,677 | 7/1972 | Condas et al. | 250/461.1 |
| 4,031,542 | 6/1977 | Anderson | 358/60 |
| 4,533,950 | 8/1985 | Harshbarger | 358/139 |
| 4,667,109 | 5/1987 | Kano | 356/401 |
| 4,744,666 | 5/1988 | Oshida et al. | 356/401 |
| 4,798,962 | 1/1989 | Matsumoto et al. | 356/401 |
| 5,194,744 | 3/1993 | Aoki et al. | 356/401 |

FOREIGN PATENT DOCUMENTS 2356925 1/1978 France.
2672700 8/1992 France.

OTHER PUBLICATIONS

Patent Abstracts of Japan, vol. 14, No. 434 (P-1107) 18 Sep. 1990 & JP, A, 02 170 193 (Sony Corp), Susumu.

Primary Examiner—Rolf Hille
Assistant Examiner—Minhloan Tran
Attorney, Agent, or Firm—Wanda K. Denson-Low

[57]  ABSTRACT

A method and apparatus is provided for ensuring that an image projected upon a visual display device is properly aligned with the viewing surface of the display device. Important to achieving the proper alignment is the use of a fluorescent ink which is visible only when illuminated under ultraviolet light. Use of the fluorescent ink allows a pattern of reference points, constituting an alignment pattern, to be permanently marked directly on the viewing surface of the visual display device, for example. Since the alignment pattern is permanently marked and is visible only when illuminated with ultraviolet light, alignment between the image and the display device can be immediately determined without the aid of additional equipment such as is employed by previously known image alignment systems.

18 Claims, 3 Drawing Sheets

METHOD AND APPARATUS FOR ALIGNING VISUAL IMAGES WITH VISUAL DISPLAY DEVICES

FIELD OF THE INVENTION

The present invention is directed toward a method and apparatus for aligning an image on a visual display device. More particularly, the present invention is directed toward ensuring proper alignment between the image and the visual display device.

BACKGROUND OF THE INVENTION

In order to ensure that visual images are properly displayed, systems have been developed to determine that the image and the visual display device onto which the image is projected are properly aligned. Proper alignment requires the comparison of reference points located or projected onto the viewing surface of the display device with similar points in an appropriate test pattern.

Previously known systems use modified slide projectors or slide projectors incorporating custom lenses and specially designed optical reticles. Alignment is achieved using either a laser theodolite or a removable clear plastic overlay template. Such a template may be installed on the face of a CRT, for example. The laser theodolite and the template may be used in conjunction to achieve the desired alignment of image and visual display device.

These previously known systems suffer from both installation and manufacturing tolerance problems. For example, back projections screens are free form blow molded. The curvature of screens produced by this process may vary from screen to screen. As a result of this variation in curvature resulting from the fabrication process, optical reticles may yield variations in tolerances from screen to screen during the alignment process.

Repeated attachments of the above-mentioned templates may lead to installation tolerance problems where the actual orientation of the template relative to the display device may vary slightly from one application to the next. As a result, attempts to evaluate alignment of image and the display device may lead to variations in tolerance when evaluations are repeated over a period of time.

The use of laser theodolites may prove expensive and very time-consuming to use in aligning images with visual display devices. Using a laser theodolite, which resembles the device used by surveyors to measure angles, the reference points are mapped on the viewing surface of the display device. The locations of the various reference points are given as coordinates, usually azimuth and elevation. However, when using a laser theodolite, each reference point must be mapped individually. Therefore, deviations from proper alignment are determined only when the map of reference points is completely constructed and the resulting map of reference points is compared with the test pattern.

Accordingly, corrections to the alignment of the display device and the test pattern due to orientation problems or distortion of the image can be made only after reconstruction of the entire array of reference points. Therefore, the use of laser theodolites is very time-consuming and expensive when determining whether an image is properly aligned with the visual display device.

The present invention addresses the above-mentioned problems in the previously known systems to provide a method and apparatus for efficiently aligning an image and a display device.

SUMMARY OF THE INVENTION

Accordingly, the present invention is directed toward a method and apparatus for ensuring that an image projected upon a visual display device is properly aligned with the viewing surface of the display device. Important to achieving the object of the invention is the use of a fluorescent ink which is visible only when illuminated under ultraviolet light. Use of the fluorescent ink allows a pattern of reference points, constituting an alignment pattern, to be permanently marked directly on the viewing surface of the visual display device, for example. Since the alignment pattern is permanently marked and is visible only when illuminated with ultraviolet light, one practicing the present invention can immediately determine whether the image and display device are properly aligned without the aid of additional equipment such as is employed by previously known image alignment systems.

The method of the present invention comprises the steps of identifying a plurality of reference points in order to establish an alignment pattern. Typically, the alignment pattern is established on a viewing surface of a visual display device. Each reference point of the alignment pattern is marked with fluorescent ink. A test pattern having a plurality of visually identifiable features is then generated for display on the viewing surface of the display device. This test pattern is then projected upon the viewing surface and the viewing surface is illuminated by an ultraviolet light source.

Alignment of the test pattern and the alignment pattern is achieved when the illuminated reference points of the test pattern are adjusted electronically to be substantially superimposed upon the visually identifiable features of the alignment pattern.

Therefore, the present invention allows immediate visual evaluation of the alignment of the test pattern and the visual display device without the use of additional apparatus.

BRIEF DESCRIPTION OF THE DRAWINGS

FIG. 6 shows a fourth embodiment of the present invention in which the visual display device is a back projection screen viewed off axis through a curved mirror.

DETAILED DESCRIPTION

The present invention relates to a method and apparatus used to ensure the proper alignment of visual display devices and the images projected upon the viewing surfaces of such devices. The following description is presented to enable one of ordinary skill in the art to make and use the invention in the context of a particular application and its requirements. Various modifications to the preferred embodiments will be readily apparent to those skilled in the art, and the generic principles defined herein may be applied to other embodiments. Thus, the present invention is not intended to be limited to the embodiments shown, but is to be accorded the widest scope consistent with the principles and novel features disclosed herein.

Figure 1:
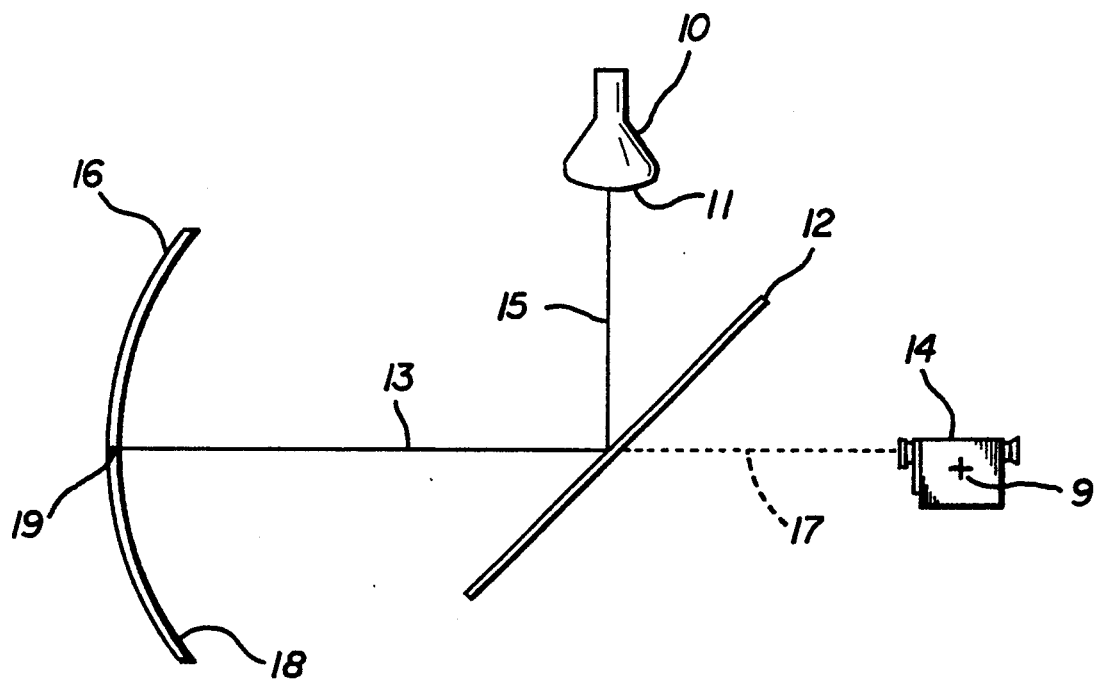
FIG. 1 illustrates an image alignment system in accordance with the prior art.

FIG. 1 illustrates a system for image-display device alignment of a wide-range collimator (WAC) device in accordance with the prior art. In this embodiment, the visual display device is a curved mirror 16 having as its viewing surface the concave surface 18 in combination with the beam-splitter 12. The beam-splitter 12 is a partially silvered mirror reflecting a portion of the light 15 incident upon it and transmitting the remainder 17. Further, the mirror 16 has a radius of curvature 13 with a center of curvature 9 and an axis 19 perpendicular to the center of curvature 9.

A CRT 10 is used to project an image onto the viewing surface 18 by means of the beam-splitter 12. A laser theodolite 14, similar in operation to a surveyor's instrument, is used to map an alignment pattern on the CRT surface 11 by assigning azimuth and elevation values to each reference point in the alignment pattern.

Ordinarily, there are several adjustments which can be made to assure an image projected by the CRT 10 is properly displayed by the mirror 16. A first set of adjustments concerns the physical orientation of the mirror 16. Adjusting the orientation of the mirror is accomplished by the appropriate rotation of the mirror 16 about the center of curvature 9, the perpendicular axis 19 or both.

Further adjustments involve the alignment between a test pattern projected by the CRT 10 and the alignment pattern mapped by using the laser theodolite 14. The alignment pattern is mapped, or created, by assigning coordinates of azimuth and elevation to each of the desired reference points as discussed above. This pattern must be compared with the visually identifiable features of the test pattern projected by the CRT 10. The test pattern and the display device are properly aligned when the visually identifiable features of the test pattern are substantially superimposed over the individual reference points of the alignment pattern.

If the visually identifiable features of the test pattern are uniformly displayed and/or rotated from the locations of the corresponding reference points in the alignment pattern, the problem of alignment may be traced to problems of orientation of the mirror 16 or to problems of the internal electronics of the CRT 10. These may be resolved, then, either by an appropriate rotation of the mirror 16 about the appropriate axis, or by adjusting the electron beam of the CRT 10.

On the other hand, if the visually identifiable features of the test pattern are not uniformly displayed and/or rotated from the positions of the reference points of the alignment pattern, the test pattern may be distorted when viewed on the viewing surface 10 and may require an internal adjustment of the CRT's 10 electronics. Adjustment of the mirror 16 may not be necessary in such a case.

In each case, comparing the test pattern with the alignment pattern is time-consuming and must be repeated when the required adjustment is made in the visual display system. Both of these cases require that each reference point be determined before any adjustment is made. Therefore, the alignment pattern must be reconstructed each time the comparison with the displayed test pattern is to be made to determine if there are any errors.

Tolerance problems arising from random imprecision in exactly reproducing the measurement of the coordinates increases the effort necessary to make a satisfactory comparison of the alignment pattern with the displayed test pattern. These errors in reproducing measurements are traceable to the tolerance to which the mirror 16 are manufactured. Therefore, these manufacturing tolerance problems are unavoidable since they cannot be eliminated completely by improving manufacturing process.

The present invention reduces these problems by minimizing both manufacturing and installation tolerance problems in evaluating the alignment of the projected image and the visual display device.

Figure 2:
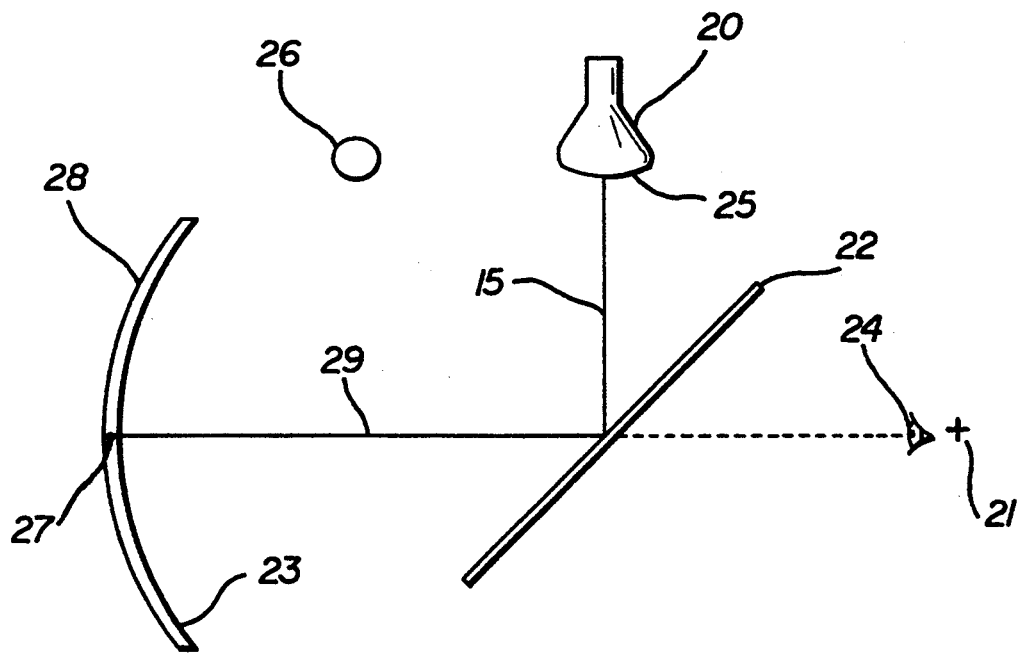
FIG. 2 shows a first embodiment of the present invention in which the visual display device is a CRT.
Figure 3:
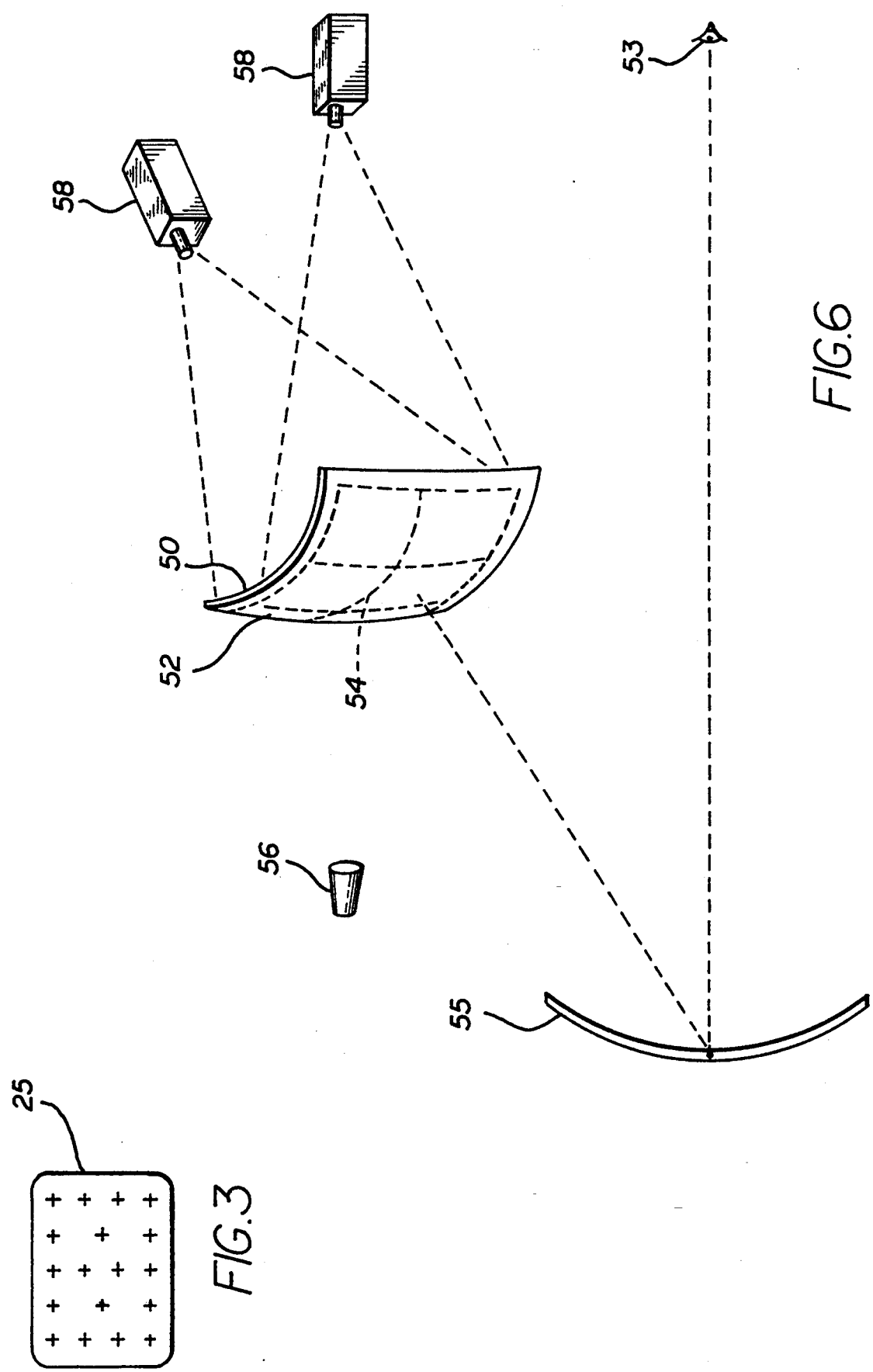
FIG. 3 details the screen of the CRT of the first embodiment of FIG. 2, the CRT's screen being the viewing surface

Regarding FIGS. 2 and 3, a first embodiment of the present invention is shown in which the visual display device is a curved mirror 28, having a radius of curvature 29 with a center of curvature 21 and an axis 27 perpendicular to the center of curvature 21, in combination with the beam-splitter 22. The viewing surface 23 is the concave surface of the mirror 28. In this embodiment, a plurality of reference points is marked with fluorescent ink, visible only when illuminated with ultraviolet light, on the screen of a CRT 20 forming an alignment pattern 25. The alignment pattern 25 on the screen of CRT 20 is shown in FIG. 3.

For purposes of evaluating the image-display device alignment, an ultraviolet light source 26 illuminates the screen 25 of the CRT aided by the beam-splitter 22. A test pattern, generated electronically or by computer, is then displayed on the CRT 20 and seen on the viewing surface 23. When the test pattern is displayed on the viewing surface 23, the accuracy of the alignment between the alignment pattern 25 and the displayed image is evaluated visually by the observer 24 practicing the invention.

As discussed above, errors in alignment may arise from problems with the internal electronics of the electron beam or from misalignment of the test pattern and the alignment pattern 25. Problems arising with the electronics electron beam must be resolved in the same manner as in previously known systems. Upon alignment of the test pattern and the alignment pattern 25, the patterns will appear to be substantially superimposed, such that the viewer will see two superimposed images 25. However, these problems are more easily identified in the present invention, and misalignment of the test pattern can easily be seen. Therefore, instead of repeating the time consuming measurement of each reference point, as was necessary in the prior art, by illuminating the test pattern an overall alignment problem of the screen can be immediately ascertained. Since the alignment pattern 25 is permanently marked on the surface of the CRT 20, this invention minimizes the manufacturing and installation tolerance problems of previously known systems.

Deviations from acceptable alignment can, now, immediately be traced to the orientation of the mirror 28 or the electronics of the CRT 20. Subsequent comparisons of the test pattern and the alignment pattern 25 can be made as easily as the initial evaluation since the alignment pattern 25 need not be reconstructed each time. Thus, practice of the present invention is less time-consuming than previously known systems, and therefore, less expensive to use.

Figure 4:
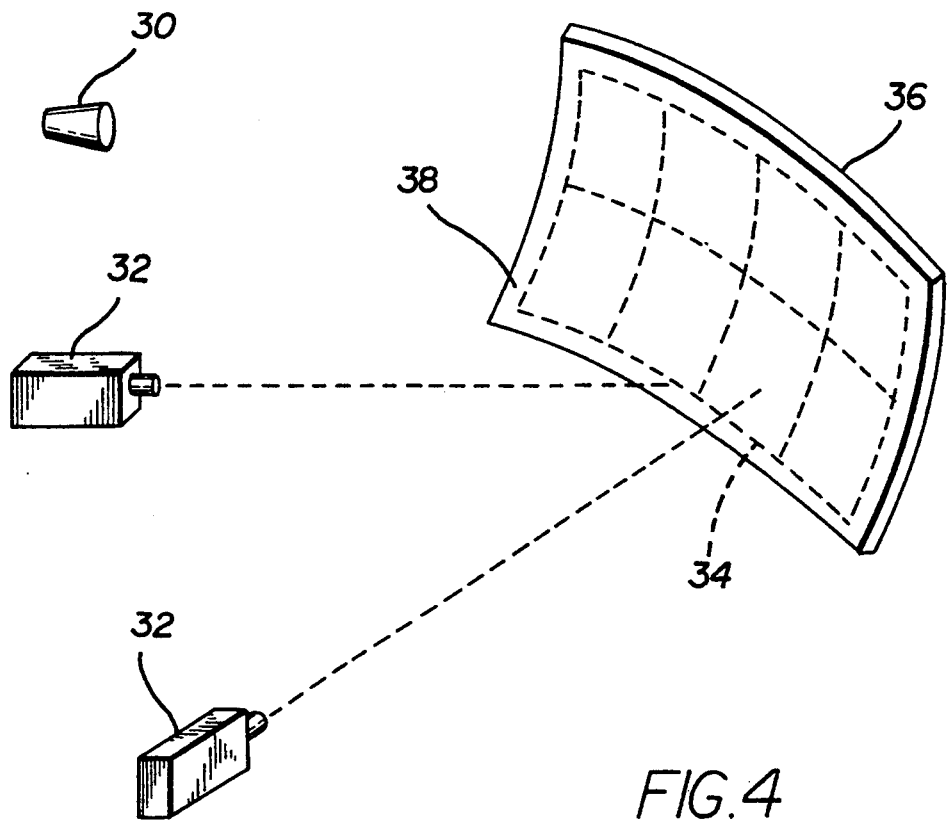
FIG. 4 shows a second embodiment of the present invention in which the visual display device is a partial dome screen.

A second embodiment of this invention is shown in FIG. 4. In this embodiment, a partial spherical or aspheric screen is the visual display device 36 having a viewing surface 38 which has a concave curvature. A plurality of reference points 34 has been identified and marked with the fluorescent ink of this invention to form an alignment pattern. A test pattern generated nominally similar to the alignment pattern 34 and electronically or by computer is projected for display onto the viewing surface 38 by one or more projectors 32. The viewing surface 38 is then illuminated with ultraviolet light from the ultraviolet light source 30. Projection of the test pattern onto the viewing surface 38 allows one practicing the invention to visually evaluate the alignment of the projector(s) 32 displaying the test pattern and the alignment pattern 34.

Should corrections in the alignment of the test pattern and the alignment pattern 34 be necessary, the position of the projector(s) 32 and/or the internal electronics of the projector(s) 32 may be adjusted such that the visually identifiable features of the test pattern are substantially superimposed over the reference points of the illuminated alignment pattern 34 so that both patterns appear as one pattern 34.

The use of fluorescent ink to mark the alignment pattern permanently on the viewing surface 38 of the display device 36 eliminates tolerance problems resulting from the manufacture of the screen 36. Small variations in the curvature of the screen 36, which may result from the molding process, need not lead to tolerance variations in the alignment pattern. Since the pattern 34 is permanently marked on each screen 36 after fabrication, the alignment pattern 34 is established in such a manner to automatically account for such curvature variations. As discussed above, this pattern need be constructed only once. Thus, deviations from alignment are immediately traced to the orientation of the display device 36 or the projected test pattern from the projector(s) 32.

Figure 5:
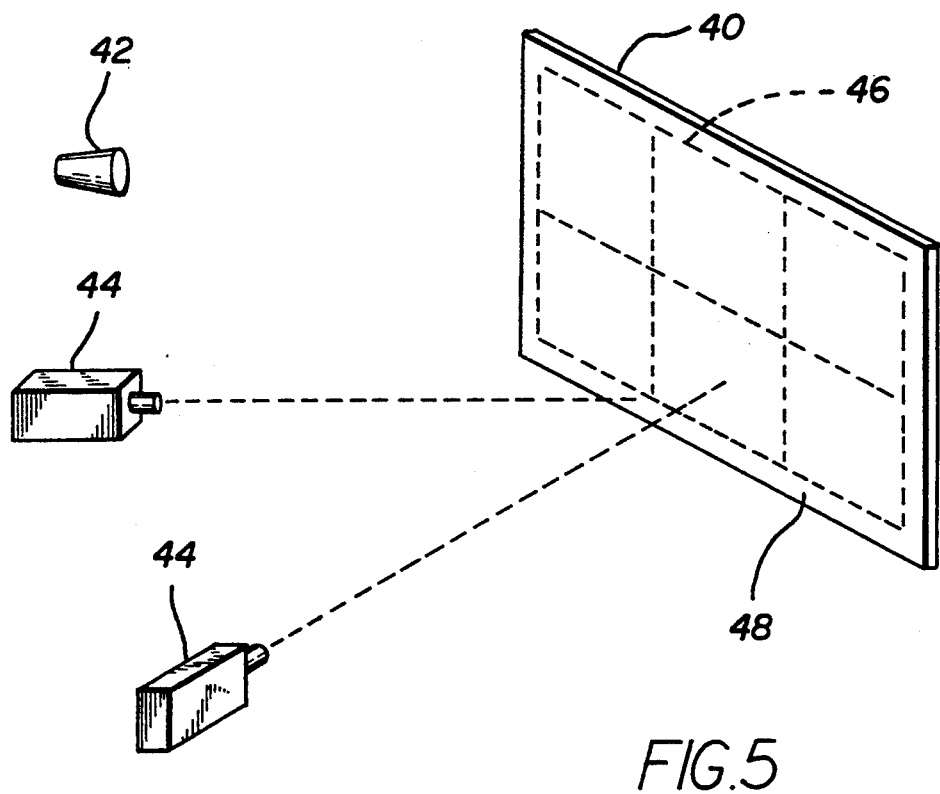
FIG. 5 shows a third embodiment of the present invention in which the visual display device is a flat projection screen, viewed from either the front or the rear.

FIG. 5 presents a third embodiment of the present invention which is similar in practice to the above-described second embodiment. In this third embodiment, the visual display device is a flat projection screen 40 on which a plurality of reference points 46 has been identified and marked with fluorescent ink to provide an alignment pattern. As in the case of the second embodiment, a test pattern having a plurality of visually identifiable features is generated electronically or by computer and projected for display by one or more projector(s) 44. The alignment pattern 46 is illuminated by means of an ultraviolet light source 42 making possible immediate visual evaluation of the alignment of the projector(s) 44 displaying the test pattern and the alignment pattern 46. Once the alignment pattern 46 is rendered visible, the position of the projector(s) 44 and/or the internal electronics of the projector(s) 44 may be adjusted so that the visually identifiable features of the test pattern are substantially superimposed on the reference points of the alignment pattern 46 so that both patterns appear as one pattern 46.

Since the alignment pattern 46 is permanently marked on the flat projection screen 40, the pattern may be marked in such a fashion to eliminate the influence of any variations in the shape of the screen 40 resulting from the fabrication process. Since the pattern 46 is marked only once, no installation tolerance problems are encountered. Rather deviations from acceptable alignment are immediately traceable to problems of orientation of the screen 40 or the electronics of the projector 44.

FIG. 6 shows a fourth embodiment of the present invention in which a translucent back projection screen 50 is the visual display device having a viewing surface 52. A plurality of reference points 54 is identified on the viewing surface 52 and marked with fluorescent ink visible only when illuminated with ultraviolet light from the ultraviolet light source 56. With the aid of the concave mirror 55, the observer 53 practicing the invention can visually evaluate the alignment between the alignment pattern 54 and the test pattern. Corrections necessitated by alignment problems can be made to the position of the projector(s) 58 and/or the internal electronics of the projector(s) 58 so that the visually identifiable features of the test pattern are substantially superimposed on the reference points of the alignment pattern 54 so that both patterns appear as one pattern 54.

Back projection screens 50 are often free form blow molded or stretch formed. Therefore, variations in the curvature of the screen 50 may result. Permanently marking the back projection screen 50, after fabrication, allows one practicing the present invention to account for these variations. Therefore, alignment of the test pattern and the display device 50 need not suffer from either installation or manufacturing tolerance problems. Thus, as in the other embodiments disclosed herein, deviations from proper alignment are traced to the orientation of the projector(s) 58 or to the electronics of the projector(s) 58. Since the alignment pattern 54 need not be reconstructed for each adjustment, much time and effort are saved by the practice of this invention.

The primary advantage of the present invention is that the fluorescent ink, being invisible under normal lighting conditions, may be permanently applied to the viewing surface of the visual display device. Since the application of the fluorescent ink is permanent, tolerance problems, both installation and manufacturing tolerance problems, are eliminated.

To further understand how such problems are eliminated, recall that the back projection screen of the fourth embodiment shown in FIG. 6 is often free form blow molded or stretch formed. As discussed above, this process often results in variations of curvature from screen to screen and these variations may lead to alignment problems using prior art methods. However, since the fluorescent ink is to be permanently applied to the viewing surface of such display devices, the test pattern could be projected upon the screen and used to select the reference points to be marked for the alignment pattern. Alternatively, the alignment pattern may be marked on the screen one time using a laser theodolite. In this way, the screen to screen tolerance variation is eliminated when the alignment is later evaluated by one practicing this invention.

Further, marking the viewing surface of the visual display device eliminates the need for repeated use of reticles, laser theodolites or slide projectors. The test pattern can be projected onto the viewing surface using the same projectors by which any other image would be projected onto the viewing surface. Thus, the alignment may be evaluated immediately with no additional special equipment. Therefore, the practice of the present invention results in a saving of time and expense over previously known systems.

Therefore, the present invention provides an improvement in the methods and apparatus used to align images with the display devices onto which they are projected.

It is understood the above-mentioned embodiments are merely illustrative of the possible specific embodiments which can represent applications of the principle of the present invention. Other arrangements may be readily devised in accordance with those principles by one of ordinary skill in the art without departing from the spirit and scope of the present invention. The scope of the invention is limited only by the following claims.

What is claimed is:

1. A method for ensuring the proper alignment of a visual display device having a viewing surface with an image projected thereon, the method comprising the steps of:
   a. identifying a plurality of fixed reference points on a reference surface;
   b. permanently marking each identified reference point with a fluorescent ink, the fluorescent ink being visible only when illuminated with ultraviolet light, to create a fixed alignment pattern;
   c. generating a test pattern having a plurality of visually identifiable features for display on the viewing surface of the visual display device;
   d. projecting the test pattern on the viewing surface of the visual display device;
   e. illuminating the reference surface with ultraviolet light in order to render the alignment pattern visible; and
   f. aligning the projected test pattern with the illuminated fixed alignment pattern.

2. The method according to claim 1 wherein the generated image comprises a computer generated test pattern.

3. The method according to claim 1 wherein the generated image comprises an electronically generated test pattern.

4. A method for ensuring the proper alignment of a wide-angle collimator (WAC) device including a concave mirror having a surface providing a WAC viewing surface, a CRT, and a beam-splitter with an image projected thereon by the CRT, the method comprising the steps of:
   a. identifying a plurality of reference points on the viewing screen of the CRT;
   b. permanently marking each identified reference point on the viewing screen of the CRT with a fluorescent ink, the fluorescent ink being visible only when illuminated with ultraviolet light, to create a fixed alignment pattern;
   c. generating a test pattern having a plurality of visually identifiable features for display on the viewing screen of the CRT;
   d. displaying the generated test pattern on the viewing screen of the CRT;
   e. illuminating the viewing screen of the CRT with ultraviolet light in order to render the alignment pattern visible; and
   f. aligning the displayed test pattern with the illuminated fixed alignment pattern.

5. A method for ensuring the proper alignment of a partial dome screen having a concave viewing surface with an image projected thereon, the method comprising the steps on:
   a. identifying a plurality of reference points on the viewing surface of the partial dome screen;
   b. marking each identified reference point with a fluorescent ink, the fluorescent ink being visible only when illuminated with ultraviolet light, to create an alignment pattern;
   c. generating a test pattern having a plurality of visually identifiable features for display on the viewing surface of the partial dome screen;
   d. projecting the generated test pattern onto the viewing surface;
   e. illuminating the viewing surface with ultraviolet light in order to render the alignment pattern visible; and
   f. aligning the projected test pattern with the illuminated alignment pattern.

6. A method for ensuring the proper alignment of a flat projection screen having a substantially planar viewing surface with an image projected thereon, the method comprising the steps of:
   a. identifying a plurality of reference points on the viewing surface of the flat projection screen;
   b. marking each identified reference point with a fluorescent ink, the fluorescent ink visible only when illuminated with ultraviolet light, to create an alignment pattern;
   c. generating a test pattern having a plurality of visually identifiable features for display on the viewing surface of the flat projection screen;
   d. projecting the generated test pattern onto the viewing surface of the flat projection screen;
   e. illuminating the viewing surface with ultraviolet light in order to render the alignment pattern visible; and
   f. aligning the test pattern with the illuminated alignment pattern.

7. A method for ensuring the proper alignment of a back projection screen having a substantially convex viewing surface with an image projected thereon, the method comprising the steps of:
   a. identifying a plurality of reference points on the viewing surface of the back projecting screen;
   b. marking each identified reference point with fluorescent ink, the fluorescent ink being visible only when illuminated with ultraviolet light, to create an alignment pattern;
   c. generating a test pattern having a plurality of visually identifiable features for display on the viewing surface of the back projection screen;
   d. projecting the test pattern onto the viewing surface of the back projection screen;
   e. illuminating the viewing surface with ultraviolet light in order to render the alignment pattern visible; and
   f. aligning the projected test pattern with the illuminated alignment pattern.

8. An apparatus for ensuring the proper alignment of a visual display device having a viewing surface with an image projected thereon, the apparatus comprising:
   a. means for identifying a plurality of reference points on the viewing surface;

b. means responsive to the identifying means for permanently marking each of the identified reference points with an identifiable material to create a fixed alignment pattern;

c. means for generating an image having a plurality of visually identifiable features for display on the viewing surface;

d. means for receiving the image from the generating means and projecting the image onto the viewing surface;

e. means response to the receiving and projecting means for illuminating the viewing surface in order to render the alignment pattern visible; and f. means responsive to the illuminating means for aligning the projected image with the illuminated alignment pattern.

9. The alignment apparatus recited in claim 8, wherein the marking means applies fluorescent ink, visible only when illuminated under ultraviolet light.

10. The alignment apparatus recited in claim 9, wherein the illuminating means comprises an ultraviolet light source.

11. The alignment apparatus according to claim 10, wherein the generating means comprises an electronically generated image.

12. The apparatus according to claim 10, wherein the generating means comprises a computer generated image.

13. The apparatus of claim 8 in which the viewing surface is a cathode ray tube.

14. The apparatus of claim 8 wherein the viewing surface is substantially flat.

15. The apparatus of claim 8 in which the viewing surface is a substantially convex surface.

16. The apparatus of claim 8 in which the viewing surface is a substantially concave surface.

17. The apparatus of claim 8 in which the viewing surface is a partially or completely cylindrical screen.

18. An apparatus for ensuring the proper alignment of a visual display device having a viewing surface on a partial dome screen with an image projected thereon, the apparatus comprising:

a. means for identifying a plurality of reference points on the viewing surface;

b. means responsive to the identifying means for marking each of the identified reference points with an identifiable material to create a fixed alignment pattern;

c. means for generating an image having a plurality of visually identifiable features for display on the viewing surface;

d. means for receiving the image from the generating means and projecting the image onto the viewing surface;

e. means response to the receiving and projecting means for illuminating the viewing surface in order to render the alignment pattern visible; and f. means responsive to the illuminating means for aligning the projected image with the illuminated alignment pattern.

* * * * *